(12) United States Patent
Virkkunen et al.

(10) Patent No.: US 10,113,021 B2
(45) Date of Patent: Oct. 30, 2018

(54) PROPYLENE RANDOM COPOLYMER

(71) Applicant: Borealis AG, Vienna (AT)

(72) Inventors: Ville Virkkunen, Helsinki (FI);
Torvald Vestberg, Porvoo (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/470,422

(22) Filed: Mar. 27, 2017

(65) Prior Publication Data

US 2017/0218104 A1    Aug. 3, 2017

Related U.S. Application Data

(62) Division of application No. 14/368,645, filed as application No. PCT/EP2012/076118 on Dec. 19, 2012, now abandoned.

(30) Foreign Application Priority Data

Dec. 30, 2011 (EP) .................................. 11196169

(51) Int. Cl.
C08F 210/06 (2006.01)

(52) U.S. Cl.
CPC ................ C08F 210/06 (2013.01)

(58) Field of Classification Search
None
See application file for complete search history.

(56) References Cited

U.S. PATENT DOCUMENTS

| | | |
|---|---|---|
| 2002/0137860 A1 | 9/2002 | Collina et al. |
| 2006/0135354 A1 | 6/2006 | Coffy et al. |
| 2010/0256318 A1 | 10/2010 | Denifl et al. |
| 2010/0267903 A1 | 10/2010 | Denifl et al. |
| 2010/0273641 A1* | 10/2010 | Chen ............... C08F 110/06 502/126 |

FOREIGN PATENT DOCUMENTS

| | | |
|---|---|---|
| CN | 1701081 A | 11/2005 |
| CN | 101080271 A | 11/2007 |
| CN | 101724111 A | 6/2010 |
| CN | 102197083 A | 9/2011 |
| CN | 102203179 A | 9/2011 |
| EP | 0 115 195 A1 | 8/1984 |
| EP | 0 341 723 A2 | 11/1989 |
| EP | 0 728 769 A1 | 8/1996 |
| EP | 1 403 292 A1 | 3/2004 |
| EP | 1 489 110 A1 | 12/2004 |
| EP | 1 862 480 A1 | 12/2007 |
| EP | 1 862 481 A1 | 12/2007 |
| JP | H02-018405 A | 1/1990 |
| JP | H11-504679 A | 4/1999 |
| JP | 2002-504954 A | 2/2002 |

(Continued)

OTHER PUBLICATIONS

International Search Report for Application No. PCT/EP2012/076118, dated Jun. 13, 2013.

(Continued)

*Primary Examiner* — Catherine S Branch
(74) *Attorney, Agent, or Firm* — Warn Partners, P.C.

(57) ABSTRACT

Propylene random copolymers with low randomness and being free of from catalyst originating phthalates.

19 Claims, 1 Drawing Sheet

(56) References Cited

FOREIGN PATENT DOCUMENTS

| | | |
|---|---|---|
| JP | 2003119216 A | 4/2003 |
| JP | 2008540756 A | 11/2008 |
| JP | 2009-534512 A | 9/2009 |
| JP | 2012514122 A | 6/2012 |
| JP | 2015-503646 A | 2/2015 |
| JP | 2015-503647 A | 2/2015 |
| KR | 10-2007-0085567 A | 8/2007 |
| KR | 10-2009-0005025 A | 1/2009 |
| KR | 10-2011-0110272 A | 10/2011 |
| TW | 509685 B | 11/2002 |
| WO | 03/068828 A1 | 8/2003 |
| WO | 2004/029112 A1 | 4/2004 |
| WO | 2006/120190 A1 | 11/2006 |
| WO | 2007/122239 A1 | 11/2007 |
| WO | 2009/068577 A1 | 6/2009 |
| WO | 2010/078479 A1 | 7/2010 |
| WO | 2011076636 A1 | 6/2011 |
| WO | 2011076637 A2 | 6/2011 |

OTHER PUBLICATIONS

Database CA [Online], Chemical Abstracts Service, Columbus, Ohio, US; Yabunochi, Nobuhiro et al.: "Ethylene-propylene random copolymer with low content of low-molecular weight amorphous polymer for heat-sealable blocking-resistant packaging films, and its manufacture", xP002676748, retrieved from STN Database accession No. 2003:309271.

\* cited by examiner

PROPYLENE RANDOM COPOLYMER

CROSS REFERENCE TO RELATED APPLICATIONS

This application is a Divisional of U.S. patent application Ser. No. 14/368,645 filed Jun. 25, 2014, which is a National Stage of International Application No. PCT/EP2012076118, filed Dec. 19, 2012. This application claims priority to European Patent Application No. EP 11196169.4 filed on Dec. 30, 2011. The disclosures of the above applications are incorporated herein by reference.

The present invention relates to specific propylene random copolymers prepared by copolymerisation of propylene with a comonomer, the comonomer being ethylene or an alpha-olefin comprising at least four carbon atoms, in particular ethylene, the propylene random copolymers being free of from catalyst originating phthalates and showing low randomness.

Propylene homopolymers have high resistance to heat and chemicals as well as beneficial mechanical properties. However, other properties of propylene homopolymers such as impact strength, in particular at low temperature, flexibility, clarity or haze need to be improved for specific applications.

It is known that mechanical properties such as impact strength or optical properties can be improved by copolymerising propylene with ethylene or other alpha-olefins. If these comonomers are randomly distributed within the polymeric chain, a propylene random copolymer is obtained.

Propylene random copolymers, in particular with the comonomer being ethylene, have found widespread applications for example in the production of polymer films, of articles produced by blow moulding or injection moulding, of fibres and of pipes.

The randomness, which has important effects on the final properties of the random copolymer, is defined as follows:

Randomness (for random propylene ethylene copolymers)=random ethylene (-P-E-P-) content/the total ethylene content×100%.

The used comonomers, preferably ethylene are inserted randomly between the propylene molecules in the polymer chain and their incorporation level can be up to 10 wt %. The comonomer incorporation results in defects in the regularity of chain configuration causing changes in physical properties. Such polymer chains are more flexible so their flexural modulus and thus stiffness is reduced.

Unfortunately for several applications stiff random copolymers are needed, as for example for pipes.

Thus there is still the need for new propylene random copolymers which have lower randomness and therefore higher stiffness compared to known propylene random copolymers.

A further aspect of the present invention is to avoid the presence of substances which are considered as potential harmful compounds regarding health as well as environmental aspects. One class of substances which have been considered as potential harmful compounds is phthalates, which have been commonly used as internal electron donors in Ziegler-Natta type catalysts. Although the amount of these phthalate compounds, used as internal donors in catalysts, in the final polymer is very small, it is still desirable to find alternative propylene random copolymers containing no catalyst originating phthalates and showing the desired polymer properties, namely low randomness.

Accordingly it is one object of the present invention to provide propylene random copolymers being free of from catalyst originating phthalates and having lower randomness compared to known Ziegler-Natta catalysts using phthalate compounds as internal donor.

Additionally it is one further object of the present invention to provide a method for preparing such random copolymers being free of from catalyst originating phthalates and having desired low randomness using special solid catalyst components prepared in different ways (e.g. precipitation or emulsion/solidification method) but with a common mechanism and without the use of phthalates as internal electron donor.

BRIEF DESCRIPTION OF THE DRAWINGS

The present invention will become more fully understood from the detailed description and the accompanying drawings, wherein.

DESCRIPTION OF THE INVENTION

Figure 1:
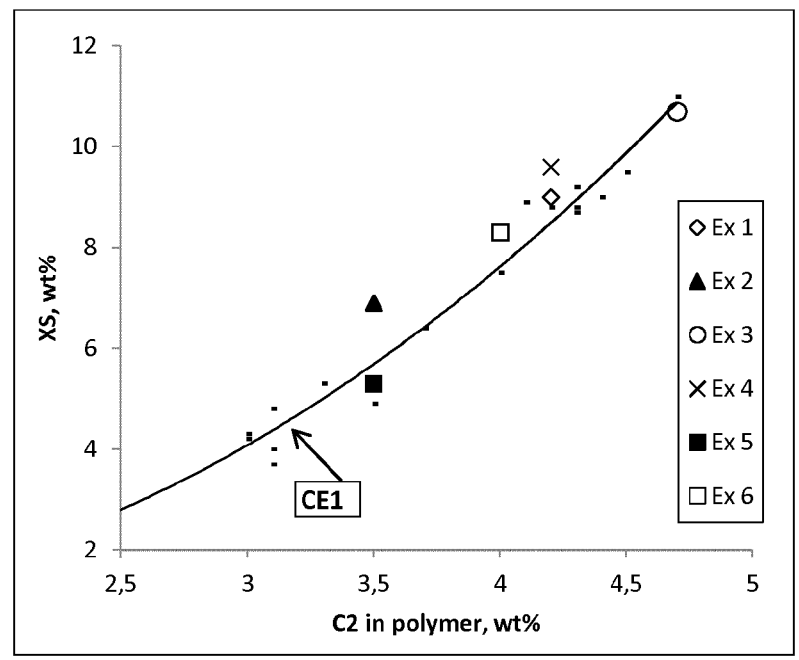
FIG. 1 is a graph depicting xylene soluble versus $C_2$ for polymers.

Accordingly the present invention provides new propylene random copolymers as defined in claim 1.

Furthermore the present invention provides a process for preparing such propylene random copolymers as defined in claim 1.

Thus the present invention provides propylene random copolymers having a) a comonomer selected from ethylene, $C_4$-$C_{20}$-alpha olefin, and any combination thereof b) a comonomer content in the range of 1.5 to at most 5.0 wt % c) a randomness in the range of 55% to at most 95% d) a xylene soluble (XS) content of 2 to <12 wt % and the propylene random copolymers being free of from catalyst originating phthalates.

Furthermore the present invention provides a process for preparing such propylene random copolymers by copolymerising propylene with a comonomer selected from ethylene, $C_4$-$C_{20}$-alpha olefin, and any combination thereof using a catalyst system comprising a co-catalyst, preferably an alkyl aluminum co-catalyst and optionally an external electron donor and an olefin polymerisation catalyst component in the form of solid particles being produced by a) preparing a solution of at least one alkoxy compound (Ax) being the reaction product of at least one compound of a Group 2 metal with at least a monohydric alcohol (A) in an organic liquid reaction medium.

b) adding said solution to at least one compound of a transition metal and c) preparing the solid catalyst component particles, wherein an internal electron donor selected from benzoates, alkylene glycol dibenzoates, maleates, 1-cyclohexene-1,2-dicarboxylic dialkylester, and 1,3-diethers, or a mixture of any selected donors, or a corresponding precursor is added at any step prior to step c).

Preferred embodiments are described in dependent claims as well in the following description.

The invention will be described in the following in greater detail, referring to the particular preferred embodiments.

The propylene random copolymers according to the invention comprise units derived from propylene and at least one comonomer selected from ethylene and $C_4$-$C_{20}$ alpha-olefins, preferably at least ethylene or a $C_4$-$C_{10}$ to alpha-olefin.

Accordingly the random propylene copolymers (R-PP) comprise units derived from propylene and at least one comonomer selected from the group consisting of ethylene, $C_4$ alpha-olefin, $C_5$ alpha-olefin, $C_6$ alpha-olefin, $C_7$ alpha-olefin, $C_8$ alpha-olefin, $C_9$ alpha-olefin and $C_{10}$ alpha-olefin. More preferably the random propylene copolymers (R-PP) comprise units derived from propylene and at least one comonomer selected from the group consisting of ethylene, 1-butene, 1-pentene, 1-hexene, 1-heptene, 1-octene, 1-nonene and 1-decene, wherein ethylene, 1-butene and 1-hexene are preferred.

It is in particular preferred that the random propylene copolymers (R-PP) consist of units derived from propylene and ethylene.

The amount of units derived from $C_2$-$C_{20}$ alpha-olefins other than propylene in the random propylene copolymers (R-PP) is in the range of 1.5 to at most 5.0 wt %, preferably 2.0 to 4.9 wt %, more preferably 2.5 to 4.8 wt %, still more preferably 3.0 to 4.7 wt %.

One requirement in the present invention is that units derived from $C_2$-$C_{20}$ alpha-olefins other than propylene within the propylene copolymer s(R-PP) are randomly distributed. The randomness indicates the amount of isolated comonomer units, i.e. those which have no other comonomer units in the neighbour, compared to the total amount of comonomers in the polymer chain.

In a preferred embodiment, the randomness of the random propylene copolymers (R-PP) is in the range 55% to at most 95%, preferably 60% to 90%, more preferably in the range of 65% to 85% and still more preferably in the range of 70% to 80%.

In addition the randomness of the phthalate free random propylene copolymers is—at a given comonomer content—at least 3% lower than the randomness of random propylene copolymers prepared by comparable Ziegler-Natta catalysts comprising a phthalate compound as internal donor.

Further it is appreciated that the xylene soluble (XS) content of the random propylene copolymers (R-PP) is rather low.

Accordingly the random propylene copolymers (R-PP) have a xylene cold soluble fraction (XCS) measured according to ISO 6427 (23° C.) in the range of 2.0 to <12.0 wt %, preferably in the range of 3.0 to <11.5 wt.-% and more preferably in the range of 4.0 to <11.0 wt %/o.

The random propylene copolymers are further characterized in that they are free of any phthalate which originates from the catalyst used during preparation of the random propylene copolymers.

The random propylene copolymers of the present invention are characterized through an excellent balance of comonomer content, randomness and xvlene soluble content, which makes them suitable for use in many applications where stiffer copolymers are needed, like for example pipes.

The random propylene copolymer (R-PP) can be unimodal or multimodal, like bimodal in view of the molecular weight distribution and/or the comonomer content distribution.

When the random propylene copolymer (R-PP) is unimodal with respect to the molecular weight distribution and/or comonomer content, it may be prepared in a single stage process e.g. as slurry or gas phase process in a slurry or gas phase reactor. Preferably, the unimodal random propylene copolymer (R-PP) is polymerised as a slurry polymerisation.

Alternatively, the unimodal the random propylene copolymer (R-PP) may be produced in a multistage process using at each stage process conditions which result in similar polymer properties.

The expression "multimodal" or "bimodal" used herein refers to the modality of the polymer, i.e.

the form of its molecular weight distribution curve, which is the graph of the molecular weight fraction as a function of its molecular weight, or more preferably the form of its comonomer content distribution curve, which is the graph of the comonomer content as a function of the molecular weight of the polymer fractions.

As will be explained below, the polymer components of the random propylene copolymers (R-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the random propylene copolymer (R-PP) may be multimodal, like bimodal, in view of the comonomer content and/or molecular weight. It is in particular appreciated that the random propylene copolymers (R-PP) are multimodal, like bimodal, in view of the comonomer content.

Further in case the random propylene copolymers (R-PP) are of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt % based on the random propylene copolymers (R-PP). Accordingly in case of a bimodal system, in particular in view of the comonomer content, the split of the two fractions is preferably 40:60 to 60:40, like roughly 50: 50.

Polymerisation processes, which are suitable for producing the random propylene copolymers of the present invention, are known in the state of the art and comprise at least one polymerisation stage, where polymerisation is typically carried out in solution, slurry, bulk or gas phase. Typically the polymerisation process comprises additional polymerisation stages or reactors. In one particular embodiment the process contains at least one bulk reactor zone and at least one gas phase reactor zone, each zone comprising at least one reactor and all reactors being arranged in cascade. In one particularly preferred embodiment the polymerisation process for polymerising olefins, in particular propylene optionally with comonomers, like ethylene or other alpha-olefins, comprises at least one bulk reactor and at least one gas phase reactor arranged in that order. In some preferred processes the process comprises one bulk reactor and at least two. e.g. two or three gas phase reactors. The process may further comprise pre- and post reactors. Pre-reactors comprise typically prepolymerisation reactors. In these kinds of processes use of higher polymerisation temperature (70° C. or higher, preferably 80° C. or higher, even 85° C. or higher) either in some or all reactors of the reactor cascade, is preferred in order to achieve some specific properties to the polymers.

The random propylene copolymers of the present invention are prepared by polymerising propylene and a comonomer, as defined above in the presence of a catalyst system.

The catalyst system being suitable for producing the random propylene copolymers of the present invention comprises a cocatalyst, optionally an external donor and a special olefin polymerisation catalyst component in the form of solid particles.

The special olefin polymerisation catalyst component in the form of solid particles is prepared by
a) preparing a solution of at least one alkoxy compound (Ax) being the reaction product of at least one compound of a Group 2 metal with at least a monohydric alcohol (A) in an organic liquid reaction medium,
b) adding said solution to at least one compound of a transition metal and
c) preparing the solid catalyst component particles,
wherein an internal electron donor selected from benzoates, alkylene glycol dibenzoates, maleates, 1-cyclohexene-1,2-dicarboxylic dialkylester, and 1,3-diethers, or a mixture of any selected donors, or a corresponding precursor is added at any step prior to step c).

The catalyst preparation is based on a liquid/liquid two-phase system (emulsion/solidification method) or on a precipitation method where no separate external carrier materials such as silica or $MgCl_2$ are needed in order to get solid catalyst particles. This process for preparing solid catalyst particles is in particular characterized in that the formation of the catalyst component comprises use of at least one alkoxy compound (Ax) being the reaction product of at least one compound of Group 2 metal and at least a monohydric alcohol (A) and further characterized that non-phthalic compounds as internal electron donor are used in the catalyst preparation as such or formed in situ.

According to one embodiment the alkoxy compound (Ax) is a reaction product of at least one compound of Group 2 metal and a monohydric alcohol (A) or a reaction product of at least one compound of Group 2 metal and a mixture of monohydric alcohol (A) with a further alcohol (B) comprising in addition to the hydroxyl moiety at least one further oxygen bearing group being different to a hydroxyl moiety.

According to a further embodiment in addition to the at least one alkoxy compound (Ax) being a reaction product of at least one compound of Group 2 metal and a monohydric alcohol (A) it is possible to use at least one additional alkoxy compound (Bx) being a reaction product of at least one compound of Group 2 metal and an alcohol comprising in addition to the hydroxyl moiety at least one further oxygen bearing group being different to a hydroxyl moiety, as defined below (alcohol B).

Preferably the alkoxy compound is alkoxy compound (Ax) being a reaction product of at least one compound of Group 2 metal, as described further below, and said alcohol (A) or said mixture of alcohol (A) and (B).

The alkoxy compounds (Ax and Bx) can be prepared in situ in the first step of the catalyst preparation process by reacting said compounds of Group 2 metal with the alcohol or alcohol mixture as described above, or said alkoxy compounds can be separately prepared reaction products, or they can be even commercially available as ready compounds and used as such in the catalyst preparation process of the invention.

During preparation of the alkoxy compounds (Ax or Bx) from the at least one compound of Group 2 metal and the alcohol or alcohol mixture as defined above, a donor or a donor precursor can be added into the reaction mixture, whereby a Group 2 metal complex (Complex Ac or Bc) is formed, which is defined in this application to be a complex of at least the Group 2 metal compound, the alcohol or alcohol mixture and a donor.

If the alkoxy compounds (Ax) and/or (Bx) are formed without using any donor(s) or donor precursor(s), donor(s) as such is added separately to the reaction product solution or during preparation of the catalyst component.

Compounds of Group 2 metal are selected from the group comprising, preferably consisting of Group 2 metal dialkyls, alkyl Group 2 metal alkoxides, alkyl Group 2 metal halides and Group 2 metal dihalides. It can further be selected from the group consisting of dialkyloxy Group 2 metal, diaryloxy Group 2 metal, alkyloxy Group 2 metal halides, aryloxy Group 2 metal halides, alkyl Group 2 metal alkoxides, aryl Group 2 metal alkoxides and alkyl Group 2 metal aryloxides. Preferably Group 2 metal is magnesium.

Monohydric alcohols (A) are those of formula ROH in which R is a linear or branched $C_1$-$C_{20}$ alkyl.

Typical $C_1$-$C_5$ monohydric alcohols are methanol, ethanol, n-propanol, iso-propanol, n-butanol, iso-butanol, sec.butanol, tert.butanol, n-amyl alcohol, iso-amyl alcohol, sec. amyl alcohol, tert. amyl alcohol, diethyl carbinol, sec. isoamyl alcohol, tert. butyl carbinol.

Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical $>C_{10}$ monohydric alcohols are n-1-undecanol, n-1-dodecanol, n-1-tridecanol, n-1-tetradecanol, n-1-pentadecanol,1-hexadecanol, n-1-heptadecanol and n-1 octadecanol. The monohydric alcohols may be unsaturated, as long as they do not act as catalyst poisons.

Preferable monohydric alcohols are those of formula ROH in which R is a $C_2$-$C_{16}$ alkyl group, most preferably a $C_4$-$C_2$ alkyl group, particularly 2-ethyl-1-hexanol.

Alcohol (B) is an alcohol which comprises in addition to the hydroxyl moiety at least one further oxygen bearing group being different to a hydroxyl moiety Typically, such further oxygen bearing group is an ether moiety. The alcohol (B) as defined above may be aliphatic or aromatic although aliphatic compounds are preferred. The aliphatic compounds may be linear, branched or cyclic or any combination thereof and in particular preferred alcohols are those comprising one ether moiety.

Illustrative examples of such preferred ether moiety containing alcohols (B) to be employed in accordance with the present invention are glycol monoethers, in particular $C_2$ to $C_4$ glycol monoethers, such as ethylene or propylene glycol monoethers wherein the ether moieties comprise from 2 to 18 carbon atoms, preferably from 2 to 12 carbon atoms. Preferred monoethers are $C_2$ to $C_4$ glycol monoethers and derivatives thereof. Illustrative and preferred examples are ethylene glycol butyl ether, ethylene glycol hexyl ether, ethylene glycol 2-ethylhexyl ether, propylene glycol n-butyl ether, propylene glycol methyl ether, propylene glycol ethyl ether, propylene glycol n-hexyl ether, propylene glycol 2-ethylhexyl ether, with ethylene glycol hexyl ether, 1,3-propylene glycol ethyl ether and 1,3-propylene glycol n-butyl ether, being particularly preferred.

The most preferred alcohol (B) is 1,3-propylene glycol ethyl ether or 1,3-propylene glycol n-butyl ether.

Usually the different complexes or alcohols are usually employed in a mole ratio of from 10:1 to 1:10, preferably this mole ratio is from 8:1 to 1:8, more preferably 6:1 to 1:6, even more preferably 4:1 to 1:4 and in embodiments also 2:1 to 1:2. This ratio can be adjusted depending on the used donor e.g. donors with short chains require longer chain alcohols and vice versa.

The reaction for the preparation of the alkoxy compounds (Ax) and (Bx) may in embodiments, be carried out preferably in an aromatic or aromatic/aliphatic medium at a temperature of 20° to 80° C. and in case that the Group 2 metal is magnesium, the preparation of the alkoxy magnesium compound may be carried out at a temperature of 50° to 70° C.

The reaction medium used as solvent can be aromatic or a mixture of aromatic and aliphatic hydrocarbons, the latter one containing 5-20 carbon atoms, preferably 5-16 carbon atoms more preferably 5-12 carbon atoms and most preferably 5 to 9 carbon atoms. Preferably, the aromatic hydrocarbon is selected substituted and unsubstituted benzenes, preferably from alkylated benzenes, even more preferably from toluene and xylenes, and is most preferably toluene.

The molar ratio of said reaction medium to magnesium is preferably less than 10, for instance from 4 to 10, preferably from 5 to 9.

Alkoxy compounds (Ax) and (Bx) are preferably alkoxy magnesium compounds.

The alkoxy magnesium compound group is preferably selected from the group consisting of magnesium dialkoxides, complexes of a magnesium dihalide and an alcohol, and complexes of a magnesium dihalide and a magnesium dialkoxide, or mixtures therefrom. More preferably the alkoxy magnesium compound is a magnesium dialkoxide compound.

The alkoxy magnesium compound group is the a reaction product of an alcohol (A) respectively alcohol (B) or a mixture of alcohol (A) and alcohol (B) with a magnesium compound selected from the group consisting of dialkyl magnesiums, alkyl magnesium alkoxides, alkyl magnesium halides and magnesium dihalides. It can further be selected from the group consisting of dialkyloxy magnesium, diaryloxy magnesium, alkyloxy magnesium halides, aryloxy magnesium halides, alkyl magnesium alkoxides, aryl magnesium alkoxides and alkyl magnesium aryloxides.

The magnesium dialkoxide may be the reaction product of dialkyl magnesium of the formula $R_2Mg$, wherein each one of the two Rs is a similar or different $C_1$-$C_{20}$ alkyl, preferably a similar or different $C_2$-$C_{10}$ alkyl, and a monohydric alcohol of formula ROH, with R being $C_1$-$C_{20}$ alkyl, preferably $C_2$-$C_{16}$ alkyl.

Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an ethyl or octyl group, i.e. the dialkyl magnesium compound is butyl octyl magnesium or ethyl butyl magnesium.

Typical alkyl-alkoxy magnesium compounds RMgOR, when used, are ethyl magnesium butoxide, butyl magnesium pentoxide, octyl magnesium butoxide and octyl magnesium octoxide.

The phthalate free electron donor compound used in the preparation of the catalyst of the present invention is preferably selected from benzoates, alkylene glycol dibenzoates, maleates, 1-cyclohexene-1,2-dicarboxylic dialkylester, and 1,3-diethers or mixtures therefrom.

Preferably the phthalate free internal donors are selected from:

a) benzoates of the formula (1)

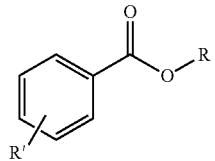

(I)

with R being a linear or branched $C_1$-$C_{12}$-alkyl group, preferably a linear or branched $C_2$-$C_{10}$-alkyl group, more preferably a linear or branched $C_4$-$C_9$-alkyl group and most preferably a branched $C_6$-$C_8$-alkyl group, like 2-ethylhexyl, and R' being H or a linear or branched $C_1$-$C_{12}$-alkyl group, preferably a linear or branched $C_2$-$C_{10}$-alkyl group more preferably a linear or branched $C_4$-$C_8$-alkyl group, like tert.-butyl or n-hexyl, whereby the alkyl group can contain one or more heteroatoms selected from O. N or S, preferably O or N, more preferably O, in the alkyl chain, or can be substituted by one or more substituents selected from =O, halogen, like chlorine, fluorine or bromine, or optionally substituted $C_6$-$C_{14}$-aryl.

The $C_6$-$C_{14}$-aryl group is preferably a phenyl group, the optional substituents on the aryl group can be linear or branched $C_1$-$C_{12}$-alkyl, preferably linear or branched $C_1$-$C_{10}$-alkyl and more preferably linear or branched $C_1$-$C_8$-alkyl or halogen, like chlorine, fluorine or bromine, preferably chlorine or bromine and more preferably chlorine. The number of substituents on the aryl group can be 0 to 4, preferably 0 to 2, more preferably 0 or 1.

R' being not H can be in ortho-meta or para position, preferably in para or ortho-position.

More preferred compounds are 2-ethylhexyl benzoate, 2-ethylhexyl (4-n-hexylbenzoate), 2-ethylhexyl (4-tert.-butylbenzoate), 2-ethylhexyl ((2-(4-chlorobenzoyl)benzoate).

b) alkylene glycol dibenzoates of the formula (II)

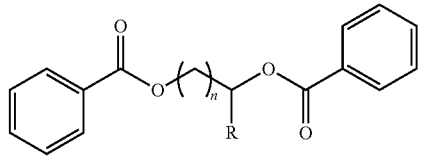

(II)

with n being 1 or 2, if n=1 then R=$CH_3$ and if n=2 then R=H.

More preferred compounds are ethylene glycol dibenzoate, 1,2-propylene glycol dibenzoate and 1,3-propylene glycol dibenzoate.

c) maleates of formula (III)

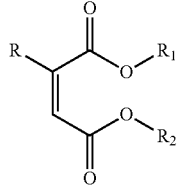

(III)

with $R_1$ and $R_2$ being the same or different and being a linear or branched $C_1$-$C_{12}$-alkyl group, preferably a linear or branched $C_1$-$C_8$-alkyl group, more preferably a linear or branched $C_1$-$C_4$-alkyl group and most preferably ethyl, whereby $R_1$ and $R_2$ are preferably the same and with R being H or a linear, branched or cyclic $C_1$ to $C_{12}$-alkyl, preferably a branched or cyclic $C_3$ to $C_8$-alkyl, like iso-butyl, cyclopentyl or cyclohexyl, whereby it is preferred that R is not H.

More preferred compounds are diethyl-2-isobutyl maleate, diethyl-2-cyclopentyl maleate and diethyl-2-cyclohexyl maleate.

d) 1-cyclohexene-1,2-dicarboxylic dialkylester of formula (IV)

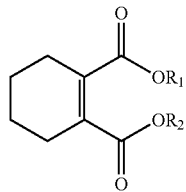

(IV)

with $R_1$ and $R_2$ can be identical or different and can be a linear or branched $C_5$-$C_{20}$-alkyl, preferably a $C_6$-$C_{16}$-alkyl and more preferably linear or branched $C_8$-$C_{12}$-alkyl. Preferably $R_1$ and $R_2$ are identical.

More preferred compound is 1-cyclohexene-1,2-(bis-(2-ethylhexyl)dicarboxylate.

e) 1,3-diethers of formula (V) or (VI)

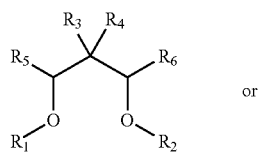

(V)

or

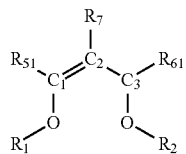

(VI)

wherein in formula (V) and (VI)

$R_1$ and $R_2$ are the same or different and can be a linear or branched $C_1$-$C_{12}$-alkyl, or $R_1$ with $R_5$ and/or $R_2$ with $R_6$ can form a ring with 4 to 6 C-atoms.

$R_3$ and $R_4$ of formula (V) are the same or different and can be H or a linear or branched $C_1$-$C_{12}$-alkyl or $R_3$ and $R_4$ can form together a ring with 5 to 10 C-atoms, which can be part of an aliphatic or aromatic polycyclic ring system with 9 to 20 C atoms.

$R_5$ and $R_6$ in formula (V) are the same or different and can be H or a linear or branched $C_1$-$C_{12}$-alkyl or can form together an aliphatic ring with 5 to 8 C-atoms.

and $R_{51}$, $R_{61}$ and $R_7$ in formula (VI) are the same or different and can be H or a linear or branched $C_1$-$C_{12}$-alkyl or two or three of $R_{51}$, $R_{61}$, $R_7$ can form together with $C_1$ to $C_3$ an aromatic ring or ring system with 6 to 14 C-atoms, preferably 10 to 14 C-atoms.

$R_1$ and $R_2$ are preferably the same in formula (V) and (VI) and can be a linear or branched $C_1$-$C_{10}$-alkyl, more preferably $C_1$-$C_8$-alkyl, like methyl, ethyl, n-propyl, i-propyl, n-butyl or tert.-butyl or 2-ethylhexyl.

In formula (V) is further possible that $R_1$ with $R_5$ and/or $R_2$ with $R_6$ can form together with the oxygen atom a ring with 4 to 6 C-atoms, preferably 4 to 5 C-atoms, like a tetrahydrofuran ring or a tetrahydropyrane ring.

$R_3$ is preferably a linear or branched $C_1$-$C_{10}$-alkyl, more preferably a $C_1$-$C_9$-alkyl, like methyl, ethyl, i-propyl, i-butyl or n-nonyl.

$R_4$ is preferably H or a linear or branched $C_1$-$C_{10}$-alkyl, more preferably a $C_1$-$C_6$-alkyl, like methyl, i-propyl, n-butyl, i-butyl, i-pentyl.

It is also possible that $R_3$ and $R_4$ can form together a ring, preferably an alicyclic ring with preferably 5 to 7 C-atoms, more preferably 5 to 6 C-atoms, like cyclopentan, 2- or 3-cyclopenten, cyclohexene, 2- or 3- or 4-cyclohexene.

It is further possible that this ring is part of an alicyclic or aromatic polycyclic ring system with 9 to 18 C-atoms, like decaline, hydroindane, fluorene or indane.

$R_5$ in formula (V) can be preferably H or a linear or branched $C_2$-$C_8$-alkyl, more preferably can be H or $C_2$-$C_6$-alkyl and most preferably H.

$R_6$ in formula (V) can be preferably H or a linear or branched $C_2$-$C_8$-alkyl, preferably H or a linear $C_3$-$C_6$-alkyl, like i-propyl or i-butyl.

In formula (V) it is further possible that $R_5$ and $R_6$ can form together an aliphatic ring with 5 to 8 C-atoms, like cyclopentan, cyclohexene or cycloheptane.

In formula (VI) $R_{51}$, $R_{61}$ and $R_7$ are the same or different and are preferably H or a linear or branched $C_1$-$C_{10}$-alkyl, more preferably H or a linear or branched $C_1$-$C_8$-alkyl like methyl, i-propyl, n-butyl, i-butyl, i-pentyl.

In formula (VI) it is further possible that two or three of $R_{51}$, $R_{61}$ and $R_7$ form together with $C_1$ to $C_3$ an aromatic ring or ring system with 6 to 14 C-atoms, preferably 10 to 14 C-atoms. Such aromatic rings or ring systems are phenyl, naphthalene, anthracene or phenanthrene. Preferably such ring system is naphthalene.

More preferred compounds are 1,8-bis(2-ethylhexyloxy)naphthalene, 3,3-bis(ethoxymethyl)-2-methyldodecane and 3,3-bis(ethoxymethyl)-2,6-dimethylheptane.

Most preferably the phthalate free internal donors are selected from 3,3-bis(ethoxymethyl)-2,6-dimethylheptane, diethyl-2-isobutyl maleate, diethyl-2-cyclopentyl maleate, diethyl-2-cyclohexyl maleate, 2-ethylhexyl (4-tert.-butylbenzoate), 2-ethylhexyl ((2-(4-chlorobenzoyl)benzoate) and 1-cyclohexene-1,2-(bis-(2-ethylhexyl)dicarboxylate or mixtures therefrom.

The compound of a transition metal is preferably a compound of a Group 4 metal. The Group 4 metal is preferably titanium, and its compound to be reacted with the complex of a Group 2 is preferably a halide. Equivalent to titanium tetrahalide is the combination of an alkoxy titanium halide and a halogenation agent therefore, which are able to form a titanium tetrahalide in situ. The most preferred halide is the chloride.

In a further embodiment of the invention, a compound of a transition metal used in the process can also contain organic ligands typically used in the field known as a single site catalyst.

In a still further embodiment of the invention, a compound of a transition metal can also be selected from Group 5 metals. Group 6 metals. Cu, Fe, Co, Ni and/or Pd compounds.

In principle said olefin polymerisation catalyst components can be obtained in several ways all based on the same mechanism.

In one embodiment the preparation of the olefin polymerisation catalyst component in form of solid particles comprises the steps of (a1) preparing a solution (S1) of at least one alkoxy compound (Ax), being a reaction product of at least one compound of a Group 2 metal with at least a monohydric alcohol (A) and an electron donor as defined above or a mixture therefrom or a corresponding precursor thereof in an organic liquid reaction medium (OM1).

(b1) combining said solution (S1) with at least one transition metal compound (CT).

(c1) precipitating said catalyst component in the form of a solid particle, and (d1) recovering the solidified particles of the olefin polymerisation catalyst component.

In step (a1) it is possible to use an alkoxy compound (Ax) being a reaction product of at least one Group 2 metal compound and a monohydric alcohol (A), as defined above.

It is further possible to use an alkoxy compound (Ax) being a reaction product of at least one Group 2 metal compound and a mixture of alcohol (A) with alcohol (B) comprising in addition to the hydroxyl moiety at least one further oxygen bearing group being different to a hydroxyl moiety, as defined above.

The third possibility is to use a mixture of an alkoxy compound (Ax) being a reaction product of at least one Group 2 metal compound and a monohydric alcohol (A) and an alkoxy compound (Bx) being a reaction product of at least one Group 2 metal compound and an alcohol (B) comprising in addition to the hydroxyl moiety at least one further oxygen bearing group being different to a hydroxyl moiety, as defined above.

It is possible to dissolve the transition metal compound (CT) in step (b1) in an organic liquid reaction medium (OM2), whereby solution (S2) is formed.

The process of solids precipitation can be carried out by several methods:

In one embodiment the addition of solution (S1) to the at least one transition metal compound (CT) in step (b1) is done at a temperature of at least 50° C. preferably in the temperature range of 50 to 110° C., more preferably in the range of 70 to 100° C., most preferably in the range of 85 to 95° C. at which temperature the at least one transition metal compound (CT) is in a liquid form, resulting in the precipitation of said solid catalyst components.

In this case it is especially appreciated that after having combined the solution (S1) with at least one transition metal compound (CT) the whole reaction mixture is kept at least at 50° C., more preferably is kept in the temperature range of 50 to 110° C., more preferably in the range of 70 to 100° C. most preferably in the range of 85 to 95° C., to secure full precipitation of the catalyst component in form of a solid particle.

In this case it is possible that a surfactant is added in step (a1) or step (b1).

General examples of surfactants include polymer surfactants, such as poly(alkyl methacrylate) and poly(alkyl acrylate), and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of surfactants that are commercially available include those under the trade marks VISCOPLEX® available from RohMax Additives, GmbH, especially those having product designations 1-254, 1-256 and those under the trade designations CARBOPOL® and PEMULEN® available from Noveon/Lubrizol.

In a second embodiment the solution (S1) is mixed with at least one transition metal compound (CT) in liquid form at a temperature of about −20° C. to about 30° C. and precipitating the solid catalyst components by subsequently slowly raising the temperature to at least 50° C., preferably in the temperature range of 50 to 110° C., more preferably in the range of 70 to 100° C. most preferably in the range of 85 to 95° C., whereby the rate of temperature increase is in the range from 0.1° C. to 30° C. per minute, preferably 0.5 to 10° C. per minute.

In this case it is especially appreciated that a surfactant is added to the solution (S1) before step (b1). Suitable surfactants are described above.

In both cases it is possible, but not necessary, to add some precipitating agent into the system. Such precipitating agents are able to effect morphology of the particles formed during the precipitation step. In a specific process no precipitating agent has been used. A precipitating agent according to this invention is an agent which promotes the precipitation of the catalyst component in form of a solid particle. The organic liquid medium used as (OM2), as defined later in this application, can promote the precipitating and thus act and used as a precipitating agent. However, the final catalyst does not contain any such medium.

Moreover it is preferred that no precipitating agent has been used in the process as stated above.

Preferably, the catalyst component as prepared in the previous paragraphs is a precipitated solid particle.

"Precipitation" according to this invention means that during the catalyst component preparation a chemical reaction in a solution takes place leading to the desired catalyst component insoluble in said solution.

Suitable alkoxy compounds (Ax) and (Bx) and their preparation have been described above.

Suitable electron donors and their precursors as well as suitable transition metal compounds are also described above.

Preferably TiCl$_4$ is used as transition metal compound.

If the electron donor is used as such, it is added to the alkoxy compound (Ax), or alkoxy compound (Bx) if present, or to the mixture of the alkoxy compounds (Ax) and (Bx), obtained by mixing alkoxy compound (Ax) being a reaction product of at least one Group 2 metal compound as described above with the monohydric alcohol (A) as described above and alkoxy compound (Bx) being a reaction product of at least one Group 2 metal compound as described above and the alcohol (B), as described above, whereby the reaction medium used as solvent for the Group 2 metal compound can be aromatic or a mixture of aromatic and aliphatic hydrocarbons, the latter one containing 5-20 carbon atoms, preferably 5-16 carbon atoms more preferably 5-12 carbon atoms and most preferably 5 to 9 carbon atoms. Preferably, the aromatic hydrocarbon is selected from substituted and unsubstituted benzenes, preferably from alkylated benzenes, even more preferably from toluene and xylenes, and is most preferably toluene.

The electron donor can also be introduced in form of a precursor as described above, which is then transformed in situ to the electron donor by reaction with a corresponding Mg-alkoxide. The Mg-alkoxide is prepared as described above by reacting a magnesium compound with the corresponding alcohol (A) or alcohol (B).

Additional donors can be added, if so desired into the catalyst preparation in any of steps (a1) to (b1). Preferably additional donors, if used, are non-phthalic acid ester as well.

It is also possible to use mixtures of the above described donors.

The reaction medium corresponds to the organic liquid reaction medium (OM1) of step (a1).

The organic liquid reaction medium (OM2), where $TiCl_4$ can be solved, can be the same as the organic liquid reaction medium (OM1) or can be different thereto, the latter being preferred.

Preferably the organic liquid reaction medium (OM2) is $C_5$ to $C_{10}$ hydrocarbon, more preferably of a $C_6$ to $C_{10}$ alkane, like heptane, octane or nonane, or any mixtures thereof.

It is in particular appreciated that the organic liquid reaction medium (OM1) is a $C_6$ to $C_{10}$ aromatic hydrocarbon, most preferably toluene, and the organic liquid reaction medium (OM2) is a $C_6$ to $C_{10}$ alkane, most preferably heptane.

Further it is appreciated that the organic liquid reaction media (OM1) and (OM2) are selected in a way which supports the precipitation of the solid catalyst particle.

When adding the solution (S1) to the at least one transition metal compound (CT) mixing is appreciated. Suitable mixing techniques include the use of mechanical as well as the use of ultrasound for mixing, as known to the skilled person.

After precipitation the solid catalyst particle is washed in a known manner.

Accordingly it is preferred that solid catalyst particle is washed at least once up to 6 times, preferably at least twice, most preferably at least three times with a hydrocarbon, which preferably is selected from aromatic and aliphatic hydrocarbons, preferably with toluene, heptane or pentane, more preferably toluene, particularly with hot (e.g. 80 to 100° C.) toluene, which might include a smaller or higher amount of $TiCl_4$ in it. The amount of $TiCl_4$ can vary from a few vol % to more than 50-vol %, such as from 5-vol % to 50-vol %, preferably from 5 to 15-vol %. It is also possible that at least one wash is done with 100-vol % $TiCl_4$.

One or several further washes after aromatic and/or $TiCl_4$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene.

In addition, during the catalyst component preparation a reducing agent, which decreases the amount of titanium present in said solidified particles of the olefin polymerisation catalyst component being present in the oxidation state +4, can be added.

Suitable reducing agents are aluminium alkyl compounds, aluminium alkyl alkoxy compounds as well as magnesium compounds as defined in the present specification.

Suitable aluminium compounds have a general formula $AlR_{3-n}X_n$, wherein R stands for a straight chain or branched alkyl or alkoxy group having 1 to 20, preferably 1 to 10 and more preferably 1 to 6 carbon atoms, X independently represents a residue selected from the group of halogen, preferably chloride, and n stands for 0, 1 or 2. At least one of the R residues has to be an alkyl group.

The compound can be added as an optional compound to the catalyst component synthesis and can be added at any step (b1) to (c1), or during the washing step as described above, however, before step (d1).

Preferably the reducing compound is added during the washing step, more preferably during the first washing step with hot toluene.

Illustrative examples of aluminium alkyl and alkoxy compounds to be employed in accordance with the present invention are:

Tri-($C_1$-$C_6$)-alkyl aluminium compounds and chlorinated aluminium alkyl compounds, especially diethyl aluminium chloride;

diethyl aluminium ethoxide, ethyl aluminium diethoxide, diethyl aluminium methoxide, diethyl aluminium propoxide, diethyl aluminium butoxide, dimethyl aluminium ethoxide, of which in particular diethyl aluminium ethoxide is preferred.

Suitable magnesium compounds are magnesium compounds as defined herein in connection with the complex of a Group 2 metal. The respective disclosure is incorporated herein by reference with respect to the magnesium compound to be added in accordance with the process of the present invention. In particular, suitable magnesium compounds are dialkyl magnesium compounds or halogenated alkyl magnesium compounds of the general formula $MgR_{2-n}X_n$, where each n is 0 or 1, and each R are same or different alkyl groups with 1 to 8 carbon atoms and X is halogen, preferably Cl. One preferred magnesium compound is butyloctyl magnesium (commercially available under the trade name BOMAG), which is already preferably used in the preparation of the Mg complex.

The added amount of the optional Al compound depends on the desired degree of reduction of amount of titanium present in the solidified particles of the olefin polymerisation catalyst component being present in the oxidation state +4. The preferred amounts of Al in the catalyst component depend to some extent on the Al compound, e.g. if an Al alkoxy compound is used, the preferred final Al amounts seem to be lower than if e.g. Al alkyl chloride compounds are used.

The final catalyst component particles have an Al content of 0.0 to 0.8 wt %, preferably 0.0 to 0.5 wt % or 0.0 to 0.4 wt %.

The magnesium compound to be added in accordance with the present invention is added in corresponding amounts.

Preferably a chlorinated aluminium alkyl compounds, especially diethyl aluminium chloride; is added.

In the second way the preparation of the catalyst component in form of solid particles comprises the steps of (a2) preparing a solution of at least one alkoxy compound (Ax), being a reaction product of at least one compound of a Group 2 metal with at least a monohydric alcohol (A) and an electron donor as described above or a precursor thereof in an organic liquid reaction medium.

(b2) adding said solution of said alkoxy compound (Ax) to at least one compound of a transition metal to produce an emulsion, wherein the dispersed phase of which is in the form of droplets and contains more than 50 mol % of the Group 2 metal in said alkoxy compound (Ax), (c2) agitating the emulsion in order to maintain the droplets of said dispersed phase within said predetermined average size range of 2 to 500 μm.

(d2) solidifying said droplets of the dispersed phase, (e2) recovering the solidified particles of the olefin polymerisation catalyst component.

In step (a2) it is possible to use an alkoxy compound (Ax) being a reaction product of at least one Group 2 metal compound and a monohydric alcohol (A), as defined above.

It is further possible to use an alkoxy compound (Ax) being a reaction product of at least one Group 2 metal compound and a mixture of alcohol (A) with alcohol (B) comprising in addition to the hydroxyl moiety at least one further oxygen bearing group being different to a hydroxyl moiety, as defined above.

The third possibility is to use a mixture of an alkoxy compound (Ax) being a reaction product of at least one Group 2 metal compound and a monohydric alcohol (A) and an alkoxy compound (Bx) being a reaction product of at least one Group 2 metal compound and an alcohol (B) comprising in addition to the hydroxyl moiety at least one further oxygen bearing group being different to a hydroxyl moiety, as defined above.

Suitable alkoxy compounds (Ax) and (Bx) and their preparation have been described above.

Suitable electron donors and their precursors as well as suitable transition metal compounds are also described above.

In step (a2) the solution (S1) is typically a solution of at least one alkoxy compound (Ax) and optionally an alkoxy compound (Bx) in liquid hydrocarbon reaction medium, which can be provided in situ by reacting an alcohol (A) or a mixture of alcohol (A) and alcohol (B) with the Group 2 metal compound in a liquid hydrocarbon medium to form alkoxy compound (Ax), as described above, and optionally mixing alkoxy compound (Ax) with alkoxy compound (Bx), prepared by reacting an alcohol (B) with the Group 2 metal compound in a liquid hydrocarbon medium.

The internal donor or precursor thereof as defined above is added preferably in step (a2) to said solution. The solution of step (a2) is then typically added to the at least one compound of a transition metal, such as titanium tetrachloride. This addition preferably is carried out at a low temperature, such as from −10 to 40° C., preferably from −5 to 30° C. such as about 0° C. to 25° C.

During any of these steps an organic reaction medium or solvent may be present, typically selected among aromatic and/or aliphatic hydrocarbons as described above.

Additional donors can be added, if so desired into the catalyst preparation in any of steps (a2) to (c2). Preferably additional donors, if used, are non-phthalic acid ester as well. It is also possible to use mixtures of the above described mixtures.

The process in accordance with the present invention yields as intermediate stage, as identified above an emulsion of a denser, transition metal compound/toluene-insoluble, oil dispersed phase typically having a transition metal metal/Group 2 mol ratio of 0.1 to 10 in an oil disperse phase having a transition metal/Group 2 mol ratio of 10 to 100.

Transition metal compound is preferably Group 4 metal compound, and is most preferably $TiCl_4$. Group 2 metal is preferably Mg. This emulsion is then typically agitated, optionally in the presence of an emulsion stabilizer and/or a turbulence minimizing agent, in order to maintain the droplets of said dispersed phase, typically within an average size range of 2 to 500 μm. The catalyst particles are obtained after solidifying said particles of the dispersed phase e.g. by heating.

The said disperse and dispersed phases are thus distinguishable from one another by the fact that the denser oil, if contacted with a solution of Group 4 metal compound preferably $TiCl_4$ in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal—which is the precursor of the ultimate catalyst component—becomes the dispersed phase, and proceeds through the further processing steps to the final particulate form. The disperse phase, still containing a useful quantity of Group 4 metal, can be reprocessed for recovery of that metal.

The production of a two-phase reaction product is encouraged by carrying out the Mg complex/Group 4 metal compound reaction at low temperature, specifically above −10° C. but below 50° C., preferably between above −5° C. and below 40° C. Since the two phases will naturally tend to separate into a lower, denser phase and supernatant lighter phase, it is necessary to maintain the reaction product as an emulsion by agitation, preferably in the presence of an emulsion stabilizer.

The emulsion, i.e. the two phase liquid-liquid system may be formed in all embodiments of the present invention by simple stirring and optionally adding (further) solvent(s) and additives, such as the turbulence minimizing agent (TMA) and/or the emulsifying agents described further below.

Emulsifying agents/emulsion stabilizers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ (meth)acrylates such as poly(hexadecyl)-methacrylate and poly(octadecyl)-methacrylate. Suitable examples of commercially available surfactants are e.g. those sold under the name of Viscoplex®, like Viscoplex®, 1-124 and 1-126, as indicated earlier in this application.

As mentioned above a turbulence minimizing agent (TMA) can be added to the reaction mixture in order to improve the emulsion formation and maintain the emulsion structure. Said TMA agent has to be inert and soluble in the reaction mixture under the reaction conditions, which means that polymers without polar groups are preferred, like polymers having linear or branched aliphatic carbon backbone chains.

Said TMA is in particular preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the Group 4 metal/Mg mol ratio of the denser oil is 1 to 5, preferably 2 to 4, and that of the disperse phase oil is 55 to 65.

Generally the ratio of the mol ratio Group 4 metal/Mg in the disperse phase oil to that in the denser oil is at least 10.

Solidification of the dispersed phase droplets by heating is suitably carried out at a temperature of 70 to 150° C., usually at 80 to 110° C., preferably at 90 to 110° C.

For isolating the solidified particles the reaction mixture is allowed to settle and the solidified particles are recovered from this reaction mixture for example by syphoning or by an in-stream filtering unit.

The solidified particulate product may be washed at least once up to 6 times, preferably at least twice, most preferably at least three times with a hydrocarbon, which preferably is selected from aromatic and aliphatic hydrocarbons, preferably with toluene, heptane or pentane, more preferably toluene, particularly with hot (e.g. 80 to 100° C.) toluene, which might include a smaller or higher amount of $TiCl_4$ in it. The amount of $TiCl_4$ can vary from a few vol % to more than 50-vol %, such as from 5-vol % to 50-vol %, preferably from 5 to 15-vol %. It is also possible that at least one wash is done with 100-vol % TiCl.

One or several further washes after aromatic and/or $TiCl_1$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene.

The washing can be optimized to give a catalyst component with novel and desirable properties.

Finally, the washed catalyst component is recovered.

It can further be dried, as by evaporation or flushing with nitrogen or it can be slurred to an oily liquid with or without any drying step.

In addition, during the catalyst component preparation a reducing agent, which decreases the amount of titanium present in said solidified particles of the olefin polymerisation catalyst component being present in the oxidation state +4, can be added.

Suitable reducing agents are aluminium alkyl compounds, aluminium alkyl alkoxy compounds as well as magnesium compounds as defined in the present specification.

Suitable aluminium compounds have a general formula $AlR_{3-n}X_n$, wherein R stands for a straight chain or branched alkyl or alkoxy group having 1 to 20, preferably 1 to 10 and more preferably 1 to 6 carbon atoms, X independently represents a residue selected from the group of halogen, preferably chloride, and n stands for 0, 1 or 2. At least one of the R residues has to be an alkyl group.

The compound can be added as an optional compound to the catalyst component synthesis and brought into contact with the droplets of the dispersed phase of the agitated emulsion before recovering the solidified particles in step (e2). I.e. the Al compound can be added at any step (b2) to (d2), or during the washing step as described above, however, before step (e2). Reference is made to WO 2004/029112. EP-A-1 862 480 and to EP-A-1 862 481. Illustrative examples of aluminium alkyl and alkoxy compounds to be employed in accordance with the present invention are:

Tri-($C_1$-$C_6$)-alkyl aluminium compounds and chlorinated aluminium ($C_1$-$C_6$)-alkyl compounds, preferably tri-ethyl aluminium, ethyl aluminium dichloride, diethyl aluminium chloride, especially diethyl aluminium chloride;

Diethyl aluminium ethoxide, ethyl aluminium diethoxide, diethyl aluminium methoxide, diethyl aluminium propoxide, diethyl aluminium butoxide, dimethyl aluminium ethoxide, of which in particular diethyl aluminium ethoxide is preferred.

Suitable magnesium compounds are magnesium compounds as defined herein in connection with the complex of a Group 2 metal. The respective disclosure is incorporated herein by reference with respect to the magnesium compound to be added in accordance with the process of the present invention. In particular, suitable magnesium compounds are dialkyl magnesium compounds or halogenated alkyl magnesium compounds of the general formula $MgR_{2-n}X_n$, where each n is 0 or 1, and each R are same or different alkyl groups with 1 to 8 carbon atoms and X is halogen, preferably Cl. One preferred magnesium compound is butyloctyl magnesium (commercially available under the trade name BOMAG), which is already preferably used in the preparation of the Mg complex.

The added amount of the optional Al compound depends on the desired degree of reduction of amount of titanium present in the solidified particles of the olefin polymerisation catalyst component being present in the oxidation state +4. The preferred amounts of Al in the catalyst component depend to some extent on the Al compound, e.g. if an Al alkoxy compound is used, the preferred final Al amounts seem to be lower than if e.g. Al alkyl chloride compounds are used.

The final catalyst component particles have an Al content of 0.0 to 0.8 wt %, preferably 0.0 to 0.5 wt %/o or 0.0 to 0.4 wt %.

The magnesium compound to be added in accordance with the present invention is added in corresponding amounts.

Preferably an Al alkyl or Al alkyl alkoxy compound, as defined above, is added.

The aluminium alkyl or alkoxy compound and the magnesium compound can be used alone or in combination.

The optional Al or Mg compound or a mixture thereof is preferably added before step (e2), more preferably during the washing step, which comprises at least one, preferably two and more preferably three washing procedures with the same or preferably different hydrocarbons as washing medium.

The aluminium alkyl or alkoxy compound and/or magnesium compound to be used in the catalyst component preparation of the invention can be added to any of the washing mediums, which are, as described above, preferably toluene, heptane and/or pentane.

Though the procatalyst preparation according to the inventive method can be carried out batch-wise, it is also preferable and possible to prepare the catalyst component semi-continuously or continuously. In such semi-continuous or continuous process, the solution of the alkoxy compound of the group 2 metal and said electron donor, which is prepared by reacting the alkoxy compound with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion. The optional TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst component, which are formed in the temperature gradient reactor when passing through said line. Such additional solvent might be the same as the organic liquid reaction medium, which is used for preparing the solution of the alkoxy compound of the group 2 metal as explained above in more detail.

The solidified particles of the olefin polymerisation catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerisation reactor, so that a continuous preparation and feed to the reactor is guaranteed. It is also possible to mix the solidified and washed catalyst component with an oily fluidic liquid and store and use the catalyst component as catalyst component-oil slurry. In this way the drying steps can be avoided, which might be sometimes detrimental to the catalyst components morphology. This oil-slurry method is described in general in EP-A-1489110 of the applicant, incorporated herein by reference.

As it can be seen from the above description of the semi-continuous or continuous process, it is thus possible to use separated reaction vessels for the different process steps and to transfer the reaction products which are prepared in the respective reaction vessels and to feed them in-line into further reaction vessels for formation of the emulsion and, subsequently, of the solidified particles.

It is preferred to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

With both production ways, the finally obtained solid catalyst component is desirably in the form of particles having generally an average size range, determined by using a Coulter Counter LS200 at room temperature (20° C.) with n-heptane as medium, of 2 to 500 µm, preferably 5 to 200 µm and more preferably 10 to 100, even an average size range of 20 to 60 µm is possible.

The particle size distribution, measured by Coulter method and defined as SPAN of the catalysts of the invention depends on the way of preparation. With the emulsion/solidification method the particle size distribution is usually lower than with the precipitation method. Nevertheless it is desired that the particle size distribution of the solid catalyst components prepared according to the precipitation method is as low as possible and even more preferred similar to that of solid catalyst components prepared according to the emulsion/solidification method.

Preferably the particle size distribution is in the range of 0.5 to at most 4.0, more preferable from 0.5 to at most 3.0 and even more preferably 0.5 to at most 2.0. SPAN is defined as $$\frac{d90\ [\mu m] - d10\ [\mu m]}{d50\ [\mu m]}$$

where d90 indicates the particle diameter at 90% cumulative size, d10 indicates the particle diameter at 10% cumulative size, and d50 indicates the particle diameter at 50% cumulative size.

Preferably the catalyst component in form of solid particles is prepared by the emulsion/solidification method. By using this method the catalyst has a narrow particle size distribution (PSD), below 1.5, preferably below 1.2.

The catalyst components according to the invention have good morphology, good particle size distribution and result in polymerisation catalysts having highly suitable polymerisation activities.

Not only the catalyst morphology, but also the catalyst composition, is of importance in getting the desired properties for the polymers, like low randomness.

The catalysts of the invention have, as mentioned above, a Group 4 metal, preferably Ti content in the range of 1.0 to 10.0 wt %, preferably 1.5 to 8.5 wt % and more preferably 2.0 to 7.0 wt % a Group 2 metal, preferably Mg content in the range of 5.0 to 22.0 wt %, preferably 6.0 to 20.0 wt % and more preferably 6.5 to 18.0 wt %; an Al content in the range of 0.0 to 0.8 wt %, preferably 0.0 to 0.5 wt % and more preferably 0.0 to 0.4 wt %.

The amount of Ti, Mg and Al is determined by ICP Analysis as described in the Experimental Part.

The amount of internal donor is in the range of 1.0 to 60.0 wt %, preferably 10 to 58 wt % and more preferably 20 to 55 wt % and is determined by HPLC or by GC.

The maximum amount of donor being possible in the solid catalyst components can be calculated according to the formula $$100-(3.917\times Mg\ \%+4.941\times Al\ \%+3.962\times Ti\ \%)=\text{max amount of donor (\%)}$$

which is based on the assumption that all Mg is in the form of $MgCl_2$, all Al is in the form of $AlCl_3$ and all Ti is in the form of $TiCl_4$ and no hydrocarbons are present.

In addition to the above describe special solid catalyst component a cocatalyst is used for producing the random propylene copolymers of the present invention. It is preferred to select the cocatalyst from the group consisting of trialkylaluminium, like triethylaluminium (TEA), triisobutylaluminium, tri-n-butylaluminium; dialkyl aluminium chloride, like dimethyl- or diethyl aluminium chloride; and alkyl aluminium sesquichloride. More preferably the cocatalyst is triethylaluminium or diethylaluminium chloride, most preferably triethylalumninium is used as cocatalyst.

Optionally one or more external donor are used, which may be typically selected e.g. from silanes or any other well known external donors in the field. External donors are known in the art and are used as stereoregulating agent in propylene polymerisation. The external donors are preferably selected from hydrocarbyloxy silane compounds, amino silane compounds and hydrocarbyloxy alkane compounds.

Typical hydrocarbyloxy silane compounds have the formula (II)

wherein
$R^7$ is an alpha- or beta-branched $C_3$-$C_{12}$-hydrocarbyl,
$R^8$ a $C_1$-$C_{12}$-hydrocarbyl, and
p is an integer 1-3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane.

Most preferably, the alkoxy silane compound having the formula (II) is dicyclopentyl dimethoxy silane or cyclohexylmethy dimethoxy silane.

Typical amino silane compounds have the formula (III)

$$Si(OR^9)_3(NR^{10}R^{11}) \quad (III)$$

wherein
$R^9$ is a hydrocarbon group having 1 to 6 carbon atoms, $R^{10}$ is a hydrocarbon group having 1 to 12 carbon atoms or hydrogen atom, and $R^{11}$ is a hydrocarbon group having 1 to 12 carbon atoms.

Preferably these compounds have the formula (IV)

$$Si(OCH_2CH_3)_3(NR^{10}R^{11}) \quad (IV)$$

wherein
$R^{10}$ and $R^{11}$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms.

It is in particular preferred that $R^{10}$ and $R^{11}$ are independently selected from the group consisting of methyl, ethyl, n-propyl, n-butyl, octyl, decanyl, iso-propyl, iso-butyl, iso-pentyl, tert.-butyl, tert.-amyl neopentyl, cyclopentyl, cyclohexyl, methylcyclopentyl and cycloheptyl.

More preferably both $R^{10}$ and $R^{11}$ are the same and have 1 to 6 carbon atoms, yet more preferably both $R^{10}$ and $R^{11}$ are a $C_1$-$C_4$-alkyl group.

Most preferably the external donor represented by the formula (III) or (IV) is diethylaminotriethoxy silane.

The external donor used for the catalyst system is therefore preferably diethyl aminotriethoxy silane, dicyclopentyl dimethoxy silane or cyclohexyl methyldimethoxy silane.

Experimental Part

1. Methods
Melt Flow Rate MFR: ISO 1133; 230 °C, 2.16 kg load
Particle Size Distribution PSD: Coulter Counter LS 200 at room temperature with heptane as medium
Mean particle size is given in μm and measured with Coulter Counter LS200 at room temperature with n-heptane as medium; particle sizes below 100 μm by transmission electron microscopy.
Median particle size (d50) is given in μm and measured with Coulter Counter LS200 at room temperature with n-heptane as medium.
Particle size (d10) is given in μm and measured with Coulter Counter LS200 at room temperature with n-heptane as medium.
Particle size (d90) is given in μm and measured with Coulter Counter LS200 at room temperature with n-heptane as medium.

SPAN is defined as follows:

$$\frac{d90 \ [\mu m] - d10 \ [\mu m]}{d50 \ [\mu m]}$$

ICP Analysis (Al, Mg, Ti)
The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was further diluted with DI water up to the final volume, V, and left to stabilize for two hours. The analysis was run at room temperature using a Thermo Elemental iCAP 6300 Inductively Coupled Plasma—Optical Emmision Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% HNO, 3% HF in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Determination of Donor Amounts in the Catalyst Components

The determination of donor amounts in the catalyst components is performed using HPLC (UV-detector, RP-8 column, 250 mm×4 mm). Pure donor compounds are used to prepare standard solutions. 50-100 mg of the catalyst component is weighed in a 20 ml vial (accuracy of weighing 0.1 mg). 10 ml acetonitrile is added and the sample suspension is sonicated for 5-10 min in an ultrasound bath. The acetonitrile suspension is diluted appropriately and a liquid sample is filtered using 0.45 μm filter to the sample vial of HPLC instrument. Peak heights are obtained from HPLC.

The percentage of donor in the catalyst component is calculated using the following equation:

$$\text{Percentage } (\%) = A_1 \cdot c \cdot V \cdot A_2^{-1} \cdot m^{-1} \cdot 0.1\%$$

where
$A_1$=height of the sample peak
c=concentration of the standard solution (mg/l)
V=volume of the sample solution (ml)
$A_2$=height of the standard peak
m=weight of the sample (mg)

Donor Analysis Via GC
The donor analysis of a catalyst was performed by taking a solid sample of mass, M, approximately 2 ml of solvent, dichloromethane, was added. Following this approximately 1 ml of deionised water was added to the vial. Finally, a known mass, N, of an internal standard, nonane, was added. The mixture was then sonicated for 15 min, to ensure full dissolution. After sonication the sample is left to settle into two phases and an aliquot of the organic phase is removed, this is then filtered through a 0.45 μm nylon filter into a vial suitable for the gas chromatography instrument.

The analysis is performed on a Perkin Elmer Auto System XL Gas Chromatograph containing a split loop injector and flame ionization detector. The column is a DB-1, 30 m long with an inner diameter of 0.32 mm and a phase thickness of 0.25 μm. The system stays at 40° C. for 5 minutes before ramping at 10° C./min up to 250° C., the system is kept at temperature for a further 4 minutes. If required the peak temperature could be raised to 300° C.

The results are calculated in following manner:

$$\text{Component(wt \%)} = \frac{Ax \times F \times N}{Ay \times Fistd \times M} \times 100$$

where:
Ax=component area
F=component factor
N=mass of internal standard (nonane), mg
Ay=area of internal standard (nonane)
Fistd=factor of internal standard (nonane)
M=mass of the sample, mg Xylene solubles XS: Xylene soluble fraction of product at 25□C.

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS \% = (100 \times m1 \times v0)/(m0 \times v1)$$

m0=initial polymer amount (g)
m1=weight of residue (g)
v0=initial volume (ml)
v1=volume of analyzed sample (ml)
Randomness Infrared (IR) spectroscopy was undertaken on Nicolet Magna IR Spectrometer 550. A 220-250 μm film was prepared from the polymer powder at 230° C. followed by rapid cooling to room temperature. All IR analysis was done within two hours of film preparation. Quantitative comonomer contents were obtained using peak areas normalised to the peak height of an internal reference band calibrated to previous $^{13}$C NMR results. Ethylene was quantified using the band at 733 cm$^{-1}$ (baseline 690-780 cm$^{-1}$) the reference band at 809 cm$^{-1}$ (baseline 750-890 cm$^{-1}$). The amount of isolated ethylene units (randomness) was estimated using the peak height of the band at 733 cm$^{-1}$ (baseline 690-780 cm$^{-1}$) and the same reference band described above. Calibration was made to previously obtained $^{13}$C NMR results.

Randomness=random ethylene (-P-E-P-) content/the total ethylene content×100%.

All reactions in the examples as described are carried out under inert conditions.

EXAMPLES

Example 1

Diether as Internal Donor

Preparation of Mg-Alkoxide

A magnesium alkoxide solution was prepared by adding, with stirring, 220.0 ml of a 20% solution in toluene of BOMAG (Mg(Bu)$_{1.5}$(Oct)$_{0.5}$, from Crompton GmbH) to a mixture of 50.0 ml 2-ethylhexanol (from Merck Chemicals) and 25.0 ml butoxypropanol (from Sigma-Aldrich) (molar ratio 2-ethylhexanol/butoxypropanol=1.9, and molar ratio alcohol/Mg=2.2) in a 300 ml glass reactor during 80 minutes. During the addition the reactor contents were maintained below 25° C. After addition of the BOMAG was completed, mixing of the reaction mixture at 25° C. was continued for another 60 minutes. The temperature of the reaction mixture was then raised to 60° C. within 14 minutes and held at that temperature for 60 minutes with stirring, at which time reaction was complete.

Preparation of Solid Catalyst Component:

In a 300 ml glass reactor 20 ml of TiCl$_4$ and 10 ml of heptane were heated to 90° C. Mixing speed was set to 150 rpm. Then a mixture of 30 ml Mg-alkoxide, prepared as described above, 2.0 ml 3,3-bis(ethoxymethyl)-2,6-dimethylheptane as donor and 2 ml of Viscoplex was slowly added. After 30 minutes mixing was stopped and the catalyst particles were allowed to settle down. After settling, liquid was syphonated away to about 20 ml level. Then the catalyst particles were washed with 100 ml of toluene at 90° C. for 0.5 h, followed by two heptane (each: 100 ml, 30 min) washes and finally one pentane wash (100 ml, 30 min). During the second heptane wash temperature was decreased to room temperature.

Example 2

Maleate as Internal Donor

2a) Preparation of Mg-Alkoxide 43.9 ml of 2-ethylhexanol were added to a 300 ml glass reactor. 123.9 ml of a 20% solution in toluene of BOMAG (butyl octyl magnesium) provided by Crompton GmbH were slowly added to the well stirred 2-ethyl hexanol. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

2b) Preparation of Mg-Complex 10.04 ml (8.87 g) of the Mg-alkoxide prepared according to Example 2a) were placed in a septa bottle (N$_2$ atmosphere, equipped with a magnetic stir bar). 4.96 ml (4.33 g) of the Mg-alkoxide prepared according to Example 5 were added at room temperature. Then 1.19 g of diethyl-2-cyclohexyl maleate were added at room temperature and the reaction mixture was mixed for 10 minutes at room temperature.

2c) Preparation of Catalyst Component 6.5 ml titanium tetrachloride were placed in a 50 ml glass reactor equipped with a mechanical stirrer at 25° C. Mixing speed was adjusted to 400 rpm. 4.2 ml of a mixture consisting of 0.30 ml of a solution in toluene of 0.60 mg Necadd 447, 0.6 ml of a 50 wt % solution in toluene of Viscoplex 1-254 and 3.30 ml heptane was added at once. Then the reactor temperature was raised to 90° C. within 5 minutes. When the temperature is reached 11.0 ml of the Mg-complex prepared according to Example 2b were added within 15 minutes with constant feed rate, whereby the temperature was kept at 90° C. during the addition. The reaction mixture was stirred for further 30 minutes at 90° C. Afterwards stirring was stopped and the reaction mixture was allowed to settle for 15 minutes at 90° C.

After settling and siphoning the solids underwent 3 washing steps:

Wash 1: Toluene/DEAC Wash

Washing with a mixture of 0.03 ml diethyl aluminum chloride and 33 ml of toluene at 90° C. for 30 minutes under stirring with 300 rpm. Afterwards stirring was stopped and the reaction mixture was allowed to settle for 15 minutes at 90° C. with subsequent siphoning.

Wash 2: $1^{st}$ Heptane Wash

Washing with 20 ml of heptane at 90° C. for 7 minutes under stirring with 300 rpm. Afterwards the reaction temperature is decreased to 25° C. during 13 minutes. Then stirring was stopped and the reaction mixture was allowed to settle for 15 minutes at 25° C. with subsequent siphoning.

Wash 3: $2^{nd}$ Heptane Wash

Washing with 20 ml of heptane at 25° C. for 20 minutes under stirring with 300 rpm. Afterwards stirring was stopped and the reaction mixture was allowed to settle for 10 minutes at 25° C. with subsequent siphoning.

Finally, the temperature was increased to 70° C. during 7 minutes followed by $N_2$ sparging for 20 minutes, to yield an airsensitive powder.

Example 3

Maleate as Internal Donor

3a) Preparation of Mg-Alkoxide 43.9 ml of 2-ethylhexanol were added to a 300 ml glass reactor. 123.9 ml of a 20% solution in toluene of BOMAG (butyl octyl magnesium) provided by Crompton GmbH were slowly added to the well stirred 2-ethyl hexanol. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

3b) Preparation of Mg-Alkoxide 41.4 ml of propylene glycol butyl ether were added to a 300 ml glass reactor. 123.9 ml of a 20% solution in toluene of BOMAG provided by Crompton GmbH were slowly added to the well stirred propylene glycol butyl ether. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

3c) Preparation of Mg-Complex 10.04 ml (8.87 g) of the Mg-alkoxide prepared according to Example 3a were placed in a septa bottle ($N_2$ atmosphere, equipped with a magnetic stir bar). 4.96 ml (4.33 g) of the Mg-alkoxide prepared according to Example 3b) were added at room temperature. Then 1.07 g of diethyl-2-isobutyl maleate were added slowly at room temperature and the reaction mixture was mixed for 10 minutes at room temperature 3d) Preparation of Catalyst Component 6.5 ml titanium tetrachloride was placed in a 50 ml glass reactor equipped with a mechanical stirrer at 25° C. Mixing speed was adjusted to 400 rpm. 4.2 ml of a mixture consisting of 0.30 ml of a solution in toluene of 0.60 mg Necadd 447, 0.6 ml of a 50 wt % solution in toluene of Viscoplex 1-254 and 3.30 ml heptane was added at once. Then the reactor temperature was raised to 90° C. within 5 minutes. When the temperature is reached 11.0 ml of the Mg-complex prepared according to Example 3c were added within 15 minutes with constant feed rate, whereby the temperature was kept at 90° C. during the addition. The reaction mixture was stirred for further 30 minutes at 90° C. Afterwards stirring was stopped and the reaction mixture was allowed to settle for 15 minutes at 90° C.

After settling and siphoning the solids underwent 3 washing steps:

Wash 1: Toluene/DEAC Wash

Washing with a mixture of 0.03 ml diethyl aluminum chloride and 33 ml of toluene at 90° C. for 30 minutes under stirring with 300 rpm. Afterwards stirring was stopped and the reaction mixture was allowed to settle for 15 minutes at 90° C. with subsequent siphoning.

Wash 2: $1^{st}$ Heptane Wash

Washing with 20 ml of heptane at 90° C. for 7 minutes under stirring with 300 rpm. Afterwards the reaction temperature is decreased to 25° C. during 13 minutes. Then stirring was stopped and the reaction mixture was allowed to settle for 15 minutes at 25° C. with subsequent siphoning.

Wash 3: $2^{nd}$ Heptane Wash

Washing with 20 ml of heptane at 25° C. for 20 minutes under stirring with 300 rpm. Afterwards stirring was stopped and the reaction mixture was allowed to settle for 10 minutes at 25° C. with subsequent siphoning.

Finally, the temperature was increased to 70° C. during 7 minutes followed by $N_2$ sparging for 20 minutes, to yield an airsensitive powder.

Example 4

Benzoate as Internal Donor

4a) Preparation of Mg-Alkoxide 43.9 ml of 2-ethylhexanol were added to a 300 ml glass reactor. 123.9 ml of a 20% solution in toluene of BOMAG (butyl octyl magnesium) provided by Crompton GmbH were slowly added to the well stirred 2-ethyl hexanol. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

4b) Preparation of Mg-Complex 14.0 ml (12.32 g) of the Mg-alkoxide prepared according to Example 4a were placed in a septa bottle ($N_2$ atmosphere, equipped with a magnetic stir bar). 1.28 ml (1.29 g) of 4-tert.-butylbenzoylchloride were slowly added at room temperature. Then the reaction mixture was mixed for 1 hour at room temperature, followed by mixing at 60° C. for one further hour.

4c) Preparation of Catalyst Component 6.5 ml titanium tetrachloride were placed in a 50 ml glass reactor equipped with a mechanical stirrer at 25° C. Mixing speed was adjusted to 400 rpm. 4.2 ml of a mixture consisting of 0.30 ml of a solution in toluene of 0.60 mg Necadd 447, 0.6 ml of a 50 wt % solution in toluene of Viscoplex 1-254 and 3.30 ml heptane was added at once. Then the reactor temperature was raised to 90° C. within 5 minutes. When the temperature is reached 11.0 ml of the Mg-complex prepared according to Example 4b) were added within 15 minutes with constant feed rate, whereby the temperature was kept at 90° C. during the addition. The reaction mixture was stirred for further 30 minutes at 90° C. Afterwards stirring was stopped and the reaction mixture was allowed to settle for 15 minutes at 90° C.

After settling and siphoning the solids underwent 3 washing steps:

Wash 1: Toluene/DEAC Wash

Washing with a mixture of 0.03 ml diethyl aluminum chloride and 33 ml of toluene at 90° C. for 30 minutes under stirring with 300 rpm. Afterwards stirring was stopped and the reaction mixture was allowed to settle for 15 minutes at 90° C. with subsequent siphoning.

Wash 2: $1^{st}$ Heptane Wash

Washing with 20 ml of heptane at 90° C. for 7 minutes under stirring with 300 rpm. Afterwards the reaction temperature is decreased to 25° C. during 13 minutes. Then stirring was stopped and the reaction mixture was allowed to settle for 15 minutes at 25° C. with subsequent siphoning.

Wash 3: $2^{nd}$ Heptane Wash

Washing with 20 ml of heptane at 25° C. for 20 minutes under stirring with 300 rpm. Afterwards stirring was stopped and the reaction mixture was allowed to settle for 10 minutes at 25° C. with subsequent siphoning.

Finally, the temperature was increased to 70° C. during 7 minutes followed by $N_2$ sparging for 20 minutes, to yield an airsensitive powder.

Example 5

Benzoate as Internal Donor

5a) Preparation of Mg-Alkoxide 43.9 ml of 2-ethylhexanol were added to a 300 ml glass reactor. 123.9 ml of a 20% solution in toluene of BOMAG (butyl octyl magnesium) provided by Crompton GmbH were slowly added to the well stirred 2-ethyl hexanol. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

5b) Preparation of Mg-Alkoxide 41.4 ml of propylene glycol butyl ether were added to a 300 ml glass reactor. 123.9 ml of a 20% solution in toluene of BOMAG provided by Crompton GmbH were slowly added to the well stirred propylene glycol butyl ether. During the addition the temperature was kept below 40° C. Then the temperature of the reaction mixture was raised to 60° C. and mixing was continued at this temperature for 60 minutes. Finally the Mg-alkoxide was transferred to septa bottles after cooling to room temperature.

5c) Preparation of Mg-Complex 6.10 ml (5.35 g) of the Mg-alkoxide prepared according to Example 5a) were placed in a septa bottle ($N_2$ atmosphere, equipped with a magnetic stir bar). 0.50 g of the donor precursor 2-(4-chlorobenzoyl)benzoylchloride (95%, obtained from StruChem) were added at room temperature, followed by addition of 3.01 ml (2.68 g) of the Mg-alkoxide prepared according to Example 5b). The temperature of the reaction was then raised to 60° C. and mixing was continued for one hour. After cooling to room temperature the Mg-complex was transferred to septa bottles.

5d) Preparation of Catalyst Component 6.5 ml titanium tetrachloride were placed in a 50 ml glass reactor equipped with a mechanical stirrer at 25° C. Mixing speed was adjusted to 400 rpm. 4.2 ml of a mixture consisting of 0.30 ml of a solution in toluene of 0.60 mg Necadd 447, 0.6 ml of a 50 wt % solution in toluene of Viscoplex 1-254 and 3.30 ml heptane was added at once. Then the reactor temperature was raised to 90° C. within 5 minutes. When the temperature is reached 11.0 ml of the Mg-complex prepared according to Example 5c) were added within 15 minutes with constant feed rate, whereby the temperature was kept at 90° C. during the addition. The reaction mixture was stirred for further 30 minutes at 90° C. Afterwards stirring was stopped and the reaction mixture was allowed to settle for 15 minutes at 90° C.

After settling and siphoning the solids underwent 3 washing steps:

Wash 1: Toluene/DEAC Wash

Washing with a mixture of 0.03 ml diethyl aluminum chloride and 33 ml of toluene at 90° C. for 30 minutes under stirring with 300 rpm. Afterwards stirring was stopped and the reaction mixture was allowed to settle for 15 minutes at 90° C. with subsequent siphoning.

Wash 2: $1^{st}$ Heptane Wash

Washing with 20 ml of heptane at 90° C. for 7 minutes under stirring with 300 rpm. Afterwards the reaction temperature is decreased to 25° C. during 13 minutes. Then stirring was stopped and the reaction mixture was allowed to settle for 15 minutes at 25° C. with subsequent siphoning.

Wash 3: $2^{nd}$ Heptane Wash

Washing with 20 ml of heptane at 25° C. for 20 minutes under stirring with 300 rpm. Afterwards stirring was stopped and the reaction mixture was allowed to settle for 10 minutes at 25° C. with subsequent siphoning.

Finally, the temperature was increased to 70° C. during 7 minutes followed by $N_2$ sparging for 20 minutes, to yield an airsensitive powder.

Example 6

Cyclohexene as Internal Donor 6 a) Preparation of a Soluble Mg-Alkoxy Compound (Ax):

43.9 ml of 2-ethyl hexanol (from Merck Chemicals) were added to a 300 ml glass reactor equipped with a mechanical stirrer. 123.9 ml of a 20% solution in toluene of BOMAG $(Mg(Bu)_{1.5}(Oct)_{0.5}$, from Crompton GmbH) were then added within 125 minutes to the well stirred 2-ethyl hexanol, whereby the temperature was kept below 30° C. The temperature was then increased to 60° C. and mixing was continued at this temperature for 1 hour. Finally, the Mg-alkoxide was transferred to a septa bottle after cooling to room temperature.

6b) Preparation of Mg Complex (Ac):

19.3 g of the Mg-alkoxide prepared according to Example 6a) were placed in a 50 ml glass reactor ($N_2$ atmosphere, equipped with a magnetic stir bar). 1.10 ml of cyclohex-1-ene-1,2-dicarbonly dichloride was then added at room temperature within 15 minutes. The reaction mixture was stirred over night at room temperature to ensure complete reaction.

6c) Preparation of the Catalyst According to the Emulsion-Solidification Method 6.5 ml $TiCl_4$ were placed in a 50 ml glass reactor equipped with a mechanical stirrer and the reactor temperature was set to 0° C. Mixing speed was adjusted to 300 rpm. 11.0 ml of the Mg-complex prepared according to Example 6b were added within 15 minutes with constant feed rate. During the addition the temperature was kept at 0° C. The temperature was raised to 25° C. and 4.2 ml of a mixture consisting of 0.30 ml of a solution in toluene of 0.60 mg Necadd 447, 0.6 ml of a 50 wt % solution in toluene of Viscoplex 1-254 and 3.30 ml heptane was added at once. The thus obtained reaction mixture was stirred for 20 minutes at 25° C. The temperature of the reaction mixture was then increased to 90° C. over a period of 20 minutes (linear heat-up profile) and held at that level for 30 minutes with stirring.

Afterwards stirring was stopped, and the reaction mixture was allowed to settle for 15 minutes at 90° C.

After settling and removing of the supernatant liquid the solids underwent 3 washing steps:

Wash 1: Toluene/Diethylalummium Chloride (DEAC) Wash

Washing with a mixture of 0.03 ml diethyl aluminum chloride and 33 ml of toluene at 90° C. for 30 minutes under stirring with 300 rpm. Afterwards stirring was stopped and the reaction mixture was allowed to settle for 15 minutes at 90° C. with subsequent siphoning.

Wash 2: 1$^{st}$ Heptane Wash

Washing with 20 ml of heptane at 90° C. for 7 minutes under stirring with 300 rpm. Afterwards the reaction temperature is decreased to 25° C. during 13 minutes. Then stirring was stopped and the reaction mixture was allowed to settle for 15 minutes at 25° C. with subsequent siphoning.

Wash 3: 2$^{nd}$ Heptane Wash

Washing with 20 ml of heptane at 25° C. for 20 minutes under stirring with 300 rpm. Afterwards stirring was stopped and the reaction mixture was allowed to settle for 10 minutes at 25° C. with subsequent siphoning Finally, the catalyst slurry was dried at room temperature by $N_2$ sparging for 2 hours, to yield a brown, air sensitive powder.

Comparative Example 1

CE1

As Comparative Example a catalyst prepared by the emulsion/solidification method according to Example 5 of EP 1403292 using phthaloyl dichloride as internal catalyst precursor (Mg-complex was prepared according to Example 1 of EP 1403292). The resulting internal donor is diethylhexyl phthalate

TABLE 1

Composition of the catalyst components

| Catalyst | Ti [wt %] | Mg [wt %] | Al [wt %] | Donor [wt %] |
|---|---|---|---|---|
| Example 1 | 3.31 | 14.7 | — | 17.6[1] |
| Example 2 | 2.98 | 13.5 | 0.50 | 35.1[2] |
| Example 3 | 4.24 | 15.1 | 0.12 | 38.1[2] |
| Example 4 | 3.34 | 11.0 | 0.07 | 43.3[2] |
| Example 5 | 2.68 | 10.9 | 0.27 | 45.4[2] |
| Example 6 | 2.4 | 12.8 | 0.36 | 38.6[2] |
| CE1 | 3.5 | 13.2 | 0.4 | 29.9[3] |

[1]measured amount using GC.
[2]The maximum amount of donor being possible in the solid catalyst components can be calculated according to the formula 100 − (3.917 * Mg % + 4.941 * Al % + 3.962 * Ti %) = max amount of donor (%) which is based on the assumption that all Mg is in the form of $MgCl_2$, all Al is in the form of $AlCl_3$ and all Ti is in the form of $TiCl_4$ and no hydrocarbons are present.
[3]measured amount of bis(2-ethylhexyl)phthalate using HPLC Example 7

Copolymerisation

A 5 litre stainless steel reactor was used for propylene polymerisations.

Triethyl aluminium (TEA) (from Witco, used as received) as a co-catalyst, dicyclopentyl dimethoxy silane (DCDS) (from Wacker, dried with molecular sieves) as an external donor and 30 ml n-pentane were mixed and allowed to react for 5 minutes. Half of the mixture was then added to the polymerisation reactor and the other half was mixed with the catalyst. After additional 5 minutes the catalyst/TEA/donor/n-pentane mixture was added to the reactor. Hydrogen and 1400 g propylene were introduced into the reactor and the temperature was raised within ca 15 minutes to the polymerisation temperature (70° C.). Ethylene feed was started 5 minutes after starting the temperature increase (at about 40° C.) and ethylene was fed continuously throughout the polymerisation. The polymerisation time at 70° C. was 60 minutes, after which the polymer formed was taken out from the reactor.

TABLE 3

Polymerisation results

| | | Catalyst | | | | | |
|---|---|---|---|---|---|---|---|
| | | Ex 1 | Ex 2 | Ex 3 | Ex 4 | Ex 5 | Ex 6 |
| Catalyst amount | [mg] | 11.2 | 18.1 | 24.2 | 30.2 | 18.1 | 50.4 |
| Al/Ti | [mol/mol] | 250 | 250 | 250 | 150 | 250 | 150 |
| TEAL | [µl] | 264 | 496 | 724 | 431 | 348 | 510 |
| DCDS | [µl] | 45 | 84 | 123 | 73 | 59 | 86 |
| $H_2$ | [mmol] | 130 | 300 | 300 | 300 | 300 | 300 |
| $C_2$-feed in total | [g] | 26.6 | 26.6 | 26.6 | 26.6 | 26.6 | 26.6 |
| $C_2$-content | [wt %] | 4.2 | 3.5 | 4.7 | 4.2 | 3.5 | 4.0 |
| $MFR_2$ | [g/10 min] | 9.3 | 5.8 | 5.7 | 7.6 | 8.0 | 12.0 |
| Randomness | [%] | 71.3 | 71.9 | 67.0 | 71.2 | 74.0 | 71.9 |
| XS | [wt %] | 9.0 | 6.9 | 10.7 | 9.6 | 5.3 | 8.3 |

Comparative Example 2

As Comparative Example 2 the catalyst from CE1 was used and polymerisation was performed using different amounts of ethylene.

Figure 2:
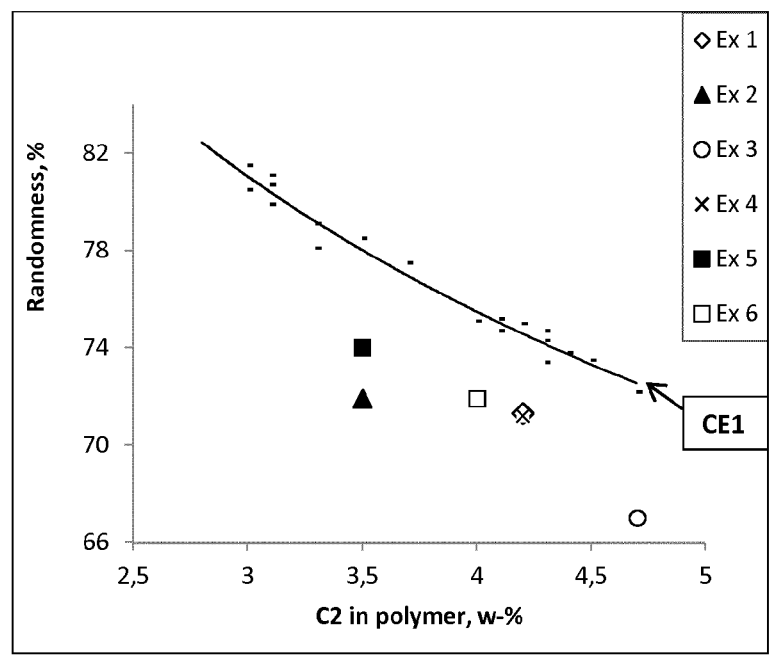
FIG. 2 is a graph depicting randomness versus $C_2$ for polymers.

The results compared to the polymers according to the invention can be seen in FIG. 1 (XS vs. $C_2$) and FIG. 2 (randomness vs. $C_2$)

As can be seen from the figures, especially FIG. 2 the randomness of the random propylene copolymers is—at a given comonomer content—at least 3% lower than the randomness of the comparative random propylene copolymer produced with a phthalate containing donor.

What is claimed is:

1. A process for preparing a propylene random copolymers, comprising:

copolymerising propylene with a comonomer selected from ethylene, $C_4$-$C_{20}$-alpha olefin, and any combination thereof using a catalyst system comprising a co-catalyst and optionally an external electron donor and an olefin polymerisation catalyst component in the form of solid particles being produced by a) preparing a solution of at least one alkoxy compound (Ax) being the reaction product of at least one compound of a Group 2 metal with at least a monohydric alcohol (A) in an organic liquid reaction medium, b) adding said solution to at least one compound of a transition metal and c) preparing the solid catalyst component particles, wherein an internal electron donor selected from benzoates, alkylene glycol dibenzoates, maleates, 1-cyclohexene-1,2-dicarboxylic dialkylester, and 1,3-ethers, or a mixture of any selected donors, or a corresponding precursor is added at any step prior to step c), wherein the propylene random copolymer has
i) the comonomer selected from ethylene, $C_4$-$C_{20}$-alpha olefin, and any combination thereof
ii) a comonomer content in the range of 1.5 to at most 5.0 wt %
iii) a randomness in the range of 60% to at most 80%
iv) a xylene soluble (XS) content of 2 to <12 wt %, and the propylene random copolymers is free from catalyst originating phthalates,
wherein in addition to the at least one alkoxy compound (Ax) at least one alkoxy compound (Bx) is present, being the reaction product of at least one compound of Group 2 metal and an alcohol (B) comprising in addition to the hydroxyl moiety at least one further oxygen bearing group being different to a hydroxyl moiety.

2. The process according to claim 1, wherein the alkoxy compound (Ax) is a reaction product of at least one compound of Group 2 metal and a monohydric alcohol (A) or a reaction product of at least one compound of Group 2 metal and a mixture of monohydric alcohol (A) with a further alcohol (B) comprising in addition to the hydroxyl moiety at least one further oxygen bearing group being different to a hydroxyl moiety.

3. The process according to claim 1, wherein the monohydric alcohols (A) are those of formula ROH in which R is a linear or branched $C_1$-$C_{20}$ alkyl.

4. The process according to claim 2, wherein in the alcohol (B) the one further oxygen bearing group is an ether moiety.

5. The process according to claim 2, wherein the alcohol (B) is a $C_2$ to $C_4$ glycol monoether, wherein the ether moiety comprises from 2 to 18 carbon atoms.

6. The process according to claim 1, wherein said Group 2 metal is magnesium.

7. The process according to claim 1, wherein said transition metal is a Group 4 metal and/or Group 5 metal.

8. The process according to claim 1, wherein the preparation of the olefin polymerisation catalyst component in form of solid particles comprises the steps of
(a1) preparing a solution (S1) of at least one alkoxy compound (Ax), being a reaction product of at least one compound of a Group 2 metal with at least a monohydric alcohol (A) and an electron donor as defined in claim 3, or a corresponding precursor thereof in an organic liquid reaction medium (OM1),
(b1) combining said solution (S1) with at least one transition metal compound (CT), and
(c1) precipitating said catalyst component in the form of a solid particle, and
(d1) recovering the solidified particles of the olefin polymerisation catalyst component.

9. The process according to claim 8, wherein the addition of solution (S1) to the at least one transition metal compound (CT) in step (b1) is done at a temperature range of 50 to 110° C., at which temperature the at least one transition metal compound (CT) is in a liquid form, resulting in the precipitation of said solid catalyst components, whereby a surfactant can be added in step (a1) or step (b1).

10. The process according to claim 8, wherein the solution (S1) is mixed with at least one transition metal compound (CT) in liquid form at a temperature of about −20° C. to about 30° C. and precipitating the solid catalyst components by subsequently slowly raising the temperature to a temperature range of 50 to 110° C., whereby the rate of temperature increase is in the range from 0.1° C. to 30° C. per minute per minute and whereby a surfactant is added to the solution (S1) before step (b1).

11. The process according to claim 1, wherein the preparation of the catalyst component in form of solid particles comprises the steps of
(a2) preparing a solution of at least one alkoxy compound (Ax), being a reaction product of at least one compound of a Group 2 metal with at least a monohydric alcohol (A) and an electron donor or a precursor thereof in an organic liquid reaction medium,
(b2) adding said solution of said alkoxy compound (Ax) to at least one compound of a transition metal to produce an emulsion, wherein the dispersed phase of which is in the form of droplets and contains more than 50 mol % of the Group 2 metal in said alkoxy compound (Ax),
(c2) agitating the emulsion in order to maintain the droplets of said dispersed phase within said predetermined average size range of 2 to 500 μm,
(d2) solidifying said droplets of the dispersed phase,
(e2) recovering the solidified particles of the olefin polymerisation catalyst component.

12. The process for preparing propylene random copolymers according to claim 1, wherein said co-catalyst is an alkyl aluminum co-catalyst.

13. The process according to claim 7, wherein said transition metal is Ti.

14. The process according to claim 10, wherein the rate of temperature increase is in the range from 0.5 to 10° C. per minute.

15. The process according to claim 1, wherein
i) the comonomer is ethylene,
ii) the comonomer content is in the range of 2.0 to 4.9 wt %,
iii) the randomness is in the range of 65% to 80%, and
iv) the xylene soluble (XS) content of 3.0 to <11.5 wt %.

16. The process according to claim 1, wherein the internal donor is selected from
a) benzoates of the formula (I)

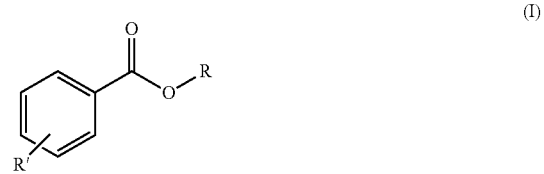

(I)

with R being a linear or branched $C_1$-$C_{12}$-alkyl group and
R' being H or a linear or branched $C_1$-$C_{12}$-alkyl group, whereby the alkyl group can contain one or more heteroatoms selected from O, N or S in the alkyl chain, or can be substituted by one or more substituents selected from =O, halogen, like chlorine, fluourine or bromine, or optionally substituted $C_6$-$C_{14}$-aryl, b) alkylene glycol dibenzoates of the formula (II)

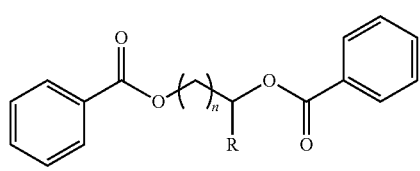

(II)

with n being 1 or 2, if n=1 then R=CH$_3$ and if n=2 then R=H, c) maleates of formula (III)

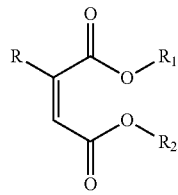

(III)

with R$_1$ and R$_2$ being the same or different and being a linear or branched C$_1$-C$_{12}$-alkyl group with R being H or a linear, branched or cyclic C$_1$ to C$_{12}$-alkyl, d) 1-cyclohexene-1,2-dicarboxylic dialester of formula (IV)

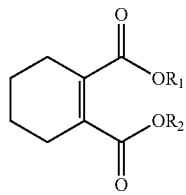

(IV)

with R$_1$ and R$_2$ can be identical or different and can be a linear or branched C$_5$-C$_{20}$-alkyl and e) 1,3-diethers of formula (V) or (VI)

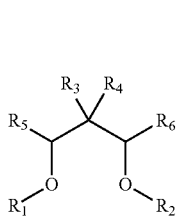

(V)

or

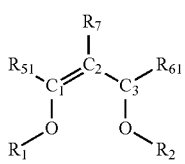

(VI)

wherein in formula (V) and (VI)

R$_1$ and R$_2$ are the same or different and can be a linear or branched C$_1$-C$_{12}$-alkyl, or R$_1$ with R$_5$ and/or R$_2$ with R$_6$ can form a ring with 4 to 6 C-atoms, R$_3$ and R$_4$ of formula (V) are the same or different and can be H or a linear or branched C$_1$-C$_{12}$-alkyl or R$_3$ and R$_4$ can form together a ring with 5 to 10 C-atoms, which can be part of an aliphatic or aromatic polycyclic ring system with 9 to 20 C atoms, R$_5$ and R$_6$ in formula (V) are the same or different and can be H or a linear or branched C$_1$-C$_{12}$-alkyl or can form together an aliphatic ring with 5 to 8 C-atoms, and R$_{51}$, R$_{61}$ and R$_7$ in formula (VI) are the same or different and can be H or a linear or branched C$_1$-C$_{12}$-alkyl or two or three of R$_{51}$, R$_{61}$ and R$_7$ can form together with C$_1$ to C$_3$ an aromatic ring or ring system with 6 to 14 C-atoms or mixtures therefrom.

17. The process according to claim 16, wherein said aromatic ring or ring system has 10 to 14 C-atoms.

18. The process according to claim 16, wherein R is formula (I) is a branched C$_6$-C$_8$-alkyl group.

19. The process according to claim 16, wherein R$_1$ and R$_2$ in formula (III) are ethyl.

* * * * *